INVENTOR:
René R. P. Piot
BY Spencer & Kaye
Attorneys

# United States Patent Office 3,487,723
Patented Jan. 6, 1970

3,487,723
EPICYCLIC GEAR BOXES
René R. P. Piot, Bordeaux-Cauderan, Gironde, France, assignor to Societe anonyme dite: Derruppe S.A., Le Bouscat-Bordeaux, Gironde, France, a French society
Filed May 2, 1967, Ser. No. 635,419
Claims priority, application France, Nov. 23, 1966, 84,711
Int. Cl. F16h 37/06
U.S. Cl. 74—682                                              20 Claims

ABSTRACT OF THE DISCLOSURE

The present invention relates to an epicyclic gear box incorporating at least four speeds and comprises at least one satellite holder, at least two planets, and at least one satellite, two of these gear trains having a common input element and there are two independent output elements and two separate reaction elements and these are selectable either separately or together. The third gear train comprises two independent input elements, an output element and two separate reaction elements and these are selectable at least separately. Means are also provided for permanently coupling the output elements of the first two gear trains to the input elements of the third gear train.

---

Figure 1:
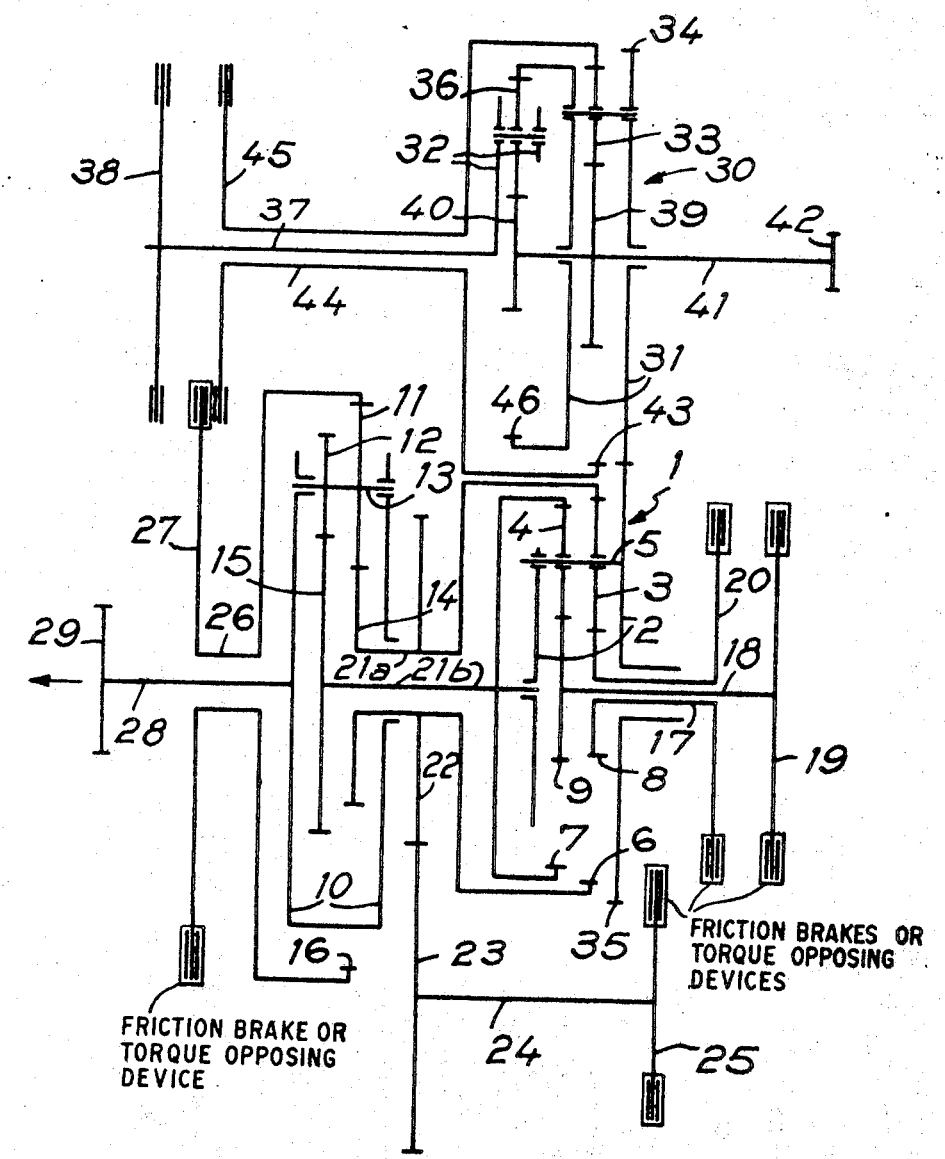

The present invention relates to a gear box with at least four speeds, of the kind in which a plurality of epicyclic gear trains is arranged and kinematically connected together, so as to permit suitable speed ranges, as well as with other components for gear and speed selection.

Gear boxes of this type are known and each of the epicyclic trains which constitutes them comprises various movable elements including at least one satellite holder, at least two satellites and at least two planets, among which elements at least one must be a reaction element in order that there may be transmission of power.

This reaction element is often associated with a brake and it is generally necessary, in addition, to insert between at least two of the movable elements, at least one clutch.

Now, the use of an integrated clutch in a gear box is particularly delicate, because if it is adjusted in order that the progressiveness of the passage from one speed to another is acceptable, the response time is too long in relation to a passage of normal duration, and if it is adjusted so that the response time is satisfactory, the coupling is effected with force. Nevertheless both a relatively short response time and an acceptable progressiveness of transmission are obtained, but one is then obliged to insert between the motor and the gear box, a torque converter such as a hydraulic coupler. The disadvantage of this arrangement is that the total cost price is considerably increased and in addition the overall efficiency of the transmission is reduced, because it is known that the efficiency of a hydraulic coupler is low.

The present invention has for an object to obtain a good progressiveness of the passage of the speeds in a very short time and be able to effect a staging of these speeds, substantially in geometrical progression for a high ratio of the extreme speeds with a reduced number of satellite holders. Another object is to eliminate the integrated clutch and the couple converter, as well as the general clutch normally connecting the output shaft of the motor to the input shaft of the box. The cost of this transmission is thus considerably reduced. However, this simplification must not be obtained to the detriment of the qualities of the gear box.

According to the invention, two of the trains have a common input element, two independent output elements and two separate reaction elements, which can be selected separately or together, whilst the third train comprises two independent input elements, an output element and two separate reaction elements, which may be selected at least separately, the output elements of the first two trains being coupled to the input elements of the third train.

According to a particularly advantageous embodiment, at least one of the reaction elements of the third train is constituted by one of its input elements; the input element of the first two trains is constituted by a single satellite holder, provided with at least two independent satellites, engaging with two peripheral planets forming output elements and with two central planets forming reaction elements; the single output element of the third train is constituted by a satellite holder provided with at least two satellites securely connected together, one of the satellites engaging with a central planet forming an input element, whilst the other satellite is in gear with a peripheral planet forming a reaction element and with a central planet concomitantly forming an input element and reaction element.

In order to obtain four forward speeds and four reverse speeds, the input element of the first two trains may be kinematically connected to an inverter.

In order to obtain eight forward speeds, the input element of the first two trains may be connected to the output element of a gear box with two speeds of the epicyclic type, comprising, in addition, an input element and two reaction elements which may be selected independently.

In order to obtain supplementary speeds with respect to the eight preceding speeds, at least one of the reaction elements of the two speed gear box constitutes a second output which may be coupled to one of the elements of the third train mentioned above.

A single supplementary forward speed may be provided and, in this case, the reaction element of the two speed gear box, constituting a second output, is capable of being coupled to the output element of the above mentioned third train.

Two supplementary backing speeds and a supplementary forward speed may also be provided. In this case, the reaction element of the two speed gear box constituting a second output can be coupled to one of the reaction elements of the third train.

In any case, the reaction elements may be selected either by immobilization and they are then advantageously constituted by disc brakes, or by application of an antitorque and they may then be eddy-currents operated.

Figure 2:
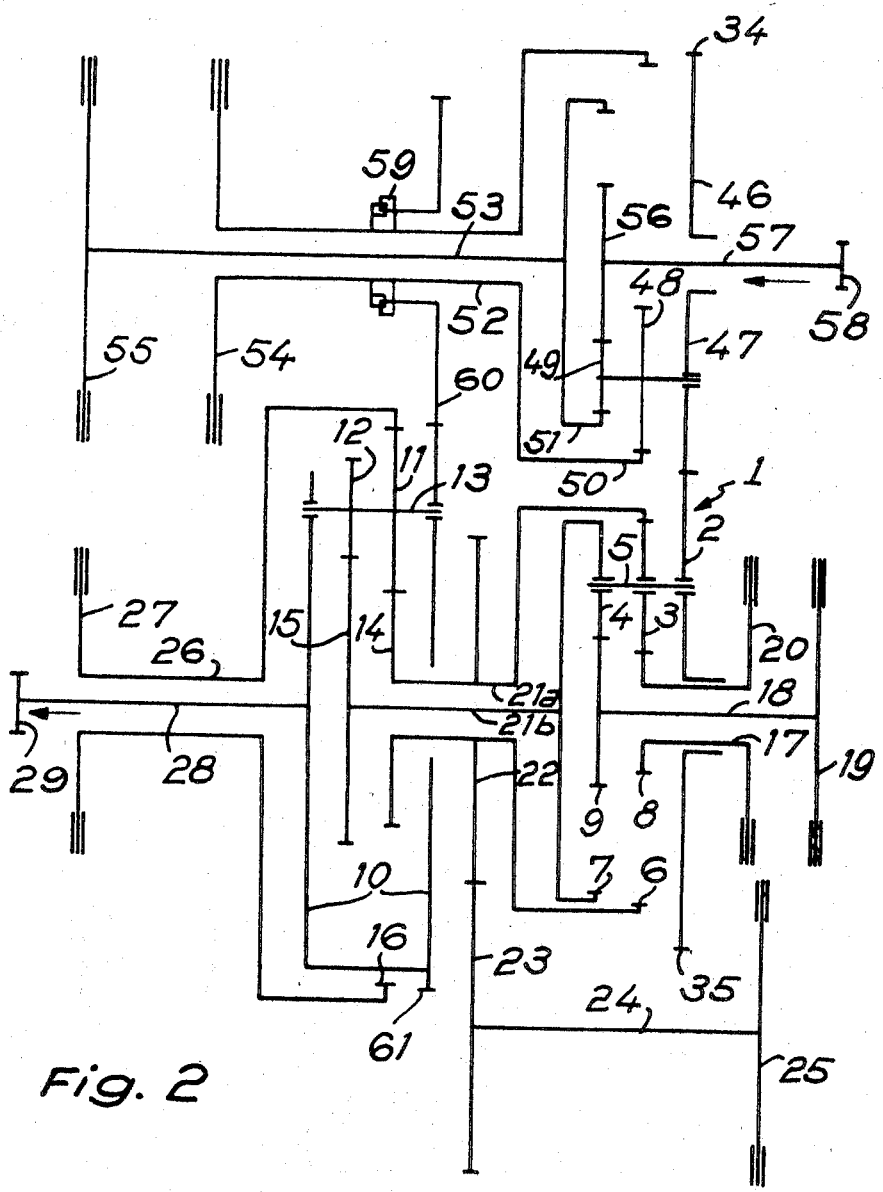
Figure 3:
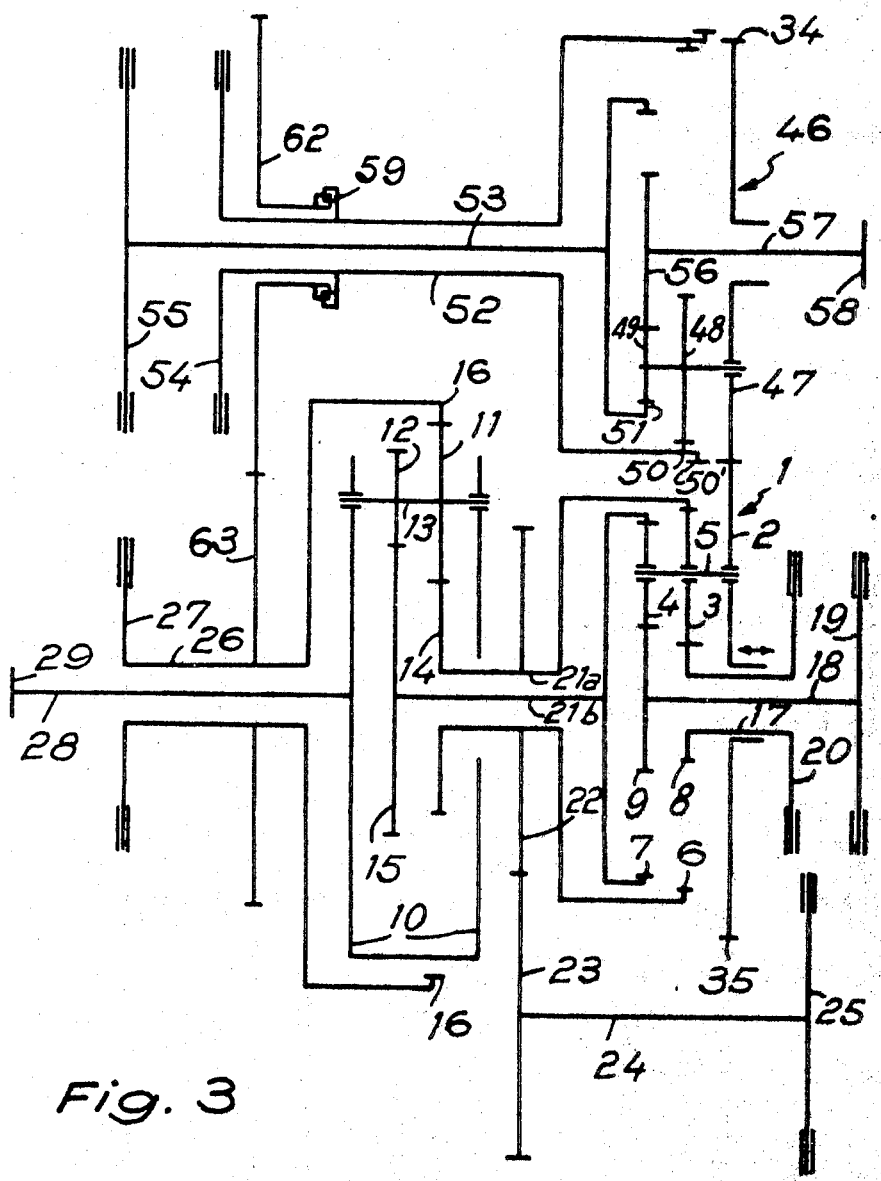

In order that the invention may be more clearly understood, reference will now be made to the accompanying drawings which show certain embodiments thereof by way of example and in which:

FIGURES 1 to 3 show kinematic diagrams schematically illustrating three particular embodiments of a gear box according to the invention, and FIGURES 4 and 4a, 5 and 5a, 6 and 6a are three pairs of partial complementary sections showing the three embodiments corresponding to FIGS. 1 to 3.

Referring to the drawings, a gear box according to the invention essentially comprises a main gear box 1 with four speeds, which forms part of the three above mentioned embodiments. It may be used alone or in combination with other members hereinafter defined apropos these embodiments.

Concerning the main box 1, this comprises various movable elements arranged in three kinematically connected, epicyclic trains. These elements are constituted by satellite holder, satellites and planets, numerous relative arrangements of which can be put to use. In any case, this main box comprises three epicyclic trains. The first two have a common input element, two independent output elements and two separate reaction elements which may be selected separately or together.

The third train comprises two independent input elements, an output element and two separate reaction elements which may be selected at least separately. The output elements of the first two trains are coupled to the input elements of the third train.

According to the system illustrated in FIGURES 1 to 3, the first two trains comprise:

A satellite holder 2 forming the common input element,

Two independent satellites 3 and 4, mounted idly about an axis 5 of the satellite holder, A peripheral planet 6 engaging with the satellite 3 and forming the output element of the first train, A peripheral planet 7 engaging with the satellite 4 and forming the output element of the second train, A central planet 8 in mesh with the satellite 3 and forming the reaction element of the first train, A central planet 9 in mesh with the satellite 4 and forming the reaction element of the second train.

The third train of the composite type comprises:

A satellite holder 10 forming the output element,

Two satellites 11 and 12 securely connected together and to a shaft 13 mounted idly in the satellite holder (these satellites being able to be free about one axis of the satellite holder), A central planet 14 engaging with the satellite 11 and forming on the one hand, a reaction element, defined by pinion 22, and on the other hand a first input element coupled to the peripheral planet 6 forming an output element of the second train, A central planet 15 engaging with the satellite 12 and forming another input element coupled to the peripheral planet 7 forming an output element of the first train, A peripheral planet 16 in gear with the satellite 11 and forming a reaction element.

The reaction elements 8, 9 and 16 must be selectable independently of one another, and to this end, they each co-operate with a respective engaging member, which may be a friction brake or torque opposing device, 20, 19 or 27 enabling, when it is controlled, either the corresponding reaction element to be immobilized, or an anti-torque to be applied thereto. Similarly, reaction element 22 should be independently selectable and is provided with an engaging member 25, which may be constituted by a friction brake or a torque opposing device.

These members, if they are of the type operating by immobilization, may be constituted by brakes. Disc brakes are recommended for preference, but it is obvious that drum brakes, electromagnetic brakes or others may be used.

These members, if they are of the type operating by an opposing torque, may for example be eddy-current brakes.

In any case, in the following, the reaction elements are associated with disc brakes, but it should be clearly understood that the latter may be replaced by any member permitting an opposing torque to be immobilized or applied to said elements.

Consequently, the central planet 8 is fixed to a tubular shaft 17 extending coaxially about a shaft 18 carrying the central planet 9, these shafts being securely connected, outside the casing of the main box 1, to the discs of two brakes 20 and 19 respectively. Similarly, the peripheral planet 6 is connected to the central planet 14 by a tubular shaft 21a coaxially surrounding the shaft 21b connecting the peripheral planet 7 to the central planet 15, this tubular shaft 21a being provided with a pinion 22 engaging with another pinion 23 fixed to a shaft 24 which is securely connected, outside the casing of the main box 1, to the disc of a brake 25. In addition, the peripheral planet 16 is mounted on a tubular shaft 26 which is securely connected, outside the above mentioned casing, to the disc of a brake 27, this tubular shaft 26 surrounding a coaxial shaft 28, interposed between the satellite holder 10 and the plate 29 of an output coupling.

As the discs of the brakes, 19, 20, 25 and 27 are situated outside the casing, they are protected from oil thrown out and there is no risk that their operation is impeded. Moreover, the heat due to the braking of one of these discs is evacuated by the ambient air and the internal temperature of the gear box is not influenced by the changes in ratios as is the case of gear boxes with multi-disc clutches or with internal brakes.

This main box 1 operates in the following manner:

In order to engage the first gear, the brakes 20 and 27 are applied, brakes 19 and 25 remaining free.

Consequently the satellite holder which is driven, orbitally rotates the satellite 3 which rolls on the central planet 8, due to the fact that the latter is immobilized by the brake 20. The satellite 3 thus has an epicyclic movement and then causes the peripheral planet 6 as well as the central planet 14 securely connected to this latter, to rotate. The satellite 11 driven by central planet 14 rolls on the peripheral planet 16, since the latter is immobilized by the brake 27, and produces, by orbital movement, the rotation of the satellite holder 10 connected to the output coupling 29.

In order to engage the second gear, the brakes 19 and 27 are applied, brakes 20 and 25 remaining free.

Consequently, the satellite holder 2 which is driven, orbitally rotates the satellite 4 which rolls on the central planet 9, due to the fact that the latter is immobilized by the brake 19. The satellite 4 thus has an epicyclic movement and thus causes the peripheral planet 7 as well as the central planet 15 securely connected thereto, to rotate. The satellite 11 securely connected to the satellite 12 which is driven by the central planet 15, rolls on the peripheral planet 16, since the latter is immobilized by the brake 27, and produces by orbital movement the rotation of the satellite holder 10 connected to the output coupling 29.

In order to engage the third gear, the brakes 19 and 20 are applied, brakes 25 and 27 remaining free.

Consequently, the satellite holder 2 which is driven, orbitally rotates the two independent satellites 3 and 4 which roll on the central planets 8 and 9 respectively, due to the fact that the latter are immobilized by the brakes 19 and 20. These satellites 3 and 4 thus rotate the peripheral planets 6 and 7 as well as the central planets, 14 and 15 securely connected to these latter. The satellites 11 and 12 are then driven by the planets 14 and 15, and, assuming that they are securely connected to one another, cause the satellite holder 10 connected to the output coupling 29 to be rotated.

In order to engage the fourth gear, the brakes 19 and 25 are applied, brakes 20 and 27 remaining free.

Under these conditions, the satellite holder 2 which is driven, orbitally rotates the satellite 4 which rolls on the central planet 9, due to the fact that the latter is immobilized by the brake 19. The satellite 4 thus has an epicyclic movement and then causes the peripheral planet 7 as well as the central planet 15 connected to this latter to be rotated. The satellite 11 securely connected to the satellite 12 which is driven by the central planet 15, rolls on the central planet 14 since the latter is immobilized by the brake 25, and thus produces, by orbital movement, the rotation of the satellite holder 10 connected to the output coupling 29. If the discs 27 and 25 are braked or slowed down simultaneously, a braking or slowing down is obtained on the transmission.

It is established that in this main box 1, the central planet 14 transmits the torque in first, participates in the transmission of the torque in third, constitutes a reaction element in fourth and participates in the transmission of the slowing down torque in the case of use as a speed checker. Similarly, the central planet 15 transmits the torque in second and fourth and participates in the transmission of the torque in third. These two planets thus accumulate the functions resulting from the particular arrangement of the box, and thus contribute to rendering this latter very compact.

In any case, if the number of teeth of the wheels of this box are chosen carefully, a staging is obtained of the four above mentioned speeds in geometrical progression with a high ratio of the extreme speeds, although said box has only two satellite holders.

By way of example, the numbers of teeth may be as follows:

For the satellites 3 and 4, 25 and 20 teeth respectively,
For the central planets 8 and 9, 23 and 28 teeth respectively,
For the peripheral planets 6 and 7, 73 and 68 teeth respectively,
For the central planets 14 and 15, 45 and 57 teeth respectively,
For the satellites 11 and 12, 31 and 20 teeth respectively,
For the peripheral planet 16, 108 teeth,
For the pinions 22 and 23, 66 and 55 teeth respectively.

In this example, if the input speed of the satellite holder 2 is 563 revolutions per minute, the output speeds are then:

in first, 218 r.p.m.
in second, 358 r.p.m.
in third, 810 r.p.m.
in fourth, 1618 r.p.m.

According to a first embodiment of the main box 1, it is desired to obtain at the output four forward speeds and four reverse speeds. To this end, and as is apparent from the kinematic diagram of FIGURE 1, the box of the invention comprises in combination with the main box 1, an inverter or reverser 30, preferably incorporating reduction.

The inverter or reverser 30 is, in the example shown, of the epicyclic type and comprises:

Two satellite holders 31 and 32 in alignment,

A satellite 33 mounted idly on the satellite holder 31, which is free and securely connected to a pinion 34 engaging with another pinion 35 fixed to the satellite holder 2 of the main box 1, A satellite 36 mounted idly on the satellite holder 32, which is connected by a shaft 37 to the disc of a brake 38, Two central planets 39 and 40 in gear with the satellites 33 and 36 respectively, these planets being securely connected to an input shaft 41, provided with one of the plates of a coupling 42 normally used for coupling up to the output shaft of a motor or engine, A peripheral planet 43 engaging with the satellite 33 and connected, by a tubular shaft 44 coaxially surrounding the shaft 37, to the disc of a brake 45, A peripheral planet 46 securely connected to the satellite holder 31, the brakes 38 and 45 being situated outside the casing of the gear box.

This reverser-reducer operates in the following manner in order to obtain at the output two speeds which are equal and of opposite direction:

In one direction, the brake 45 is applied, the brake 38 remaining free.

The central planet 39 which is driving, drives the satellite 33 which rolls on the peripheral planet 43, since the latter is immobilized by the brake 45. The satellite 33 describes an orbital rotation and transmits it to the satellite holder 31 which then drives by means of the pinions 34 and 35, the satellite holder 2 of the main box 1.

In the other direction, the brake 38 is applied, the brake 45 remaining free.

The central planet 40 which is driving, rotates the satellite 36 on itself, it being understood that the satellite holder 32 is immobilized by the brake 38. This satellite 36 then rotates the peripheral planet 46 securely connected to the satellite holder 31 which drives the satellite holder 2 of the main box 1 by means of the pinions 34 and 35.

The directions of rotation are opposite, because in one case, the satellite rolls on a fixed peripheral planet in order to drive the satellite holder, whilst in the other case, it is the peripheral planet which rolls on a satellite of fixed position in order to drive said satellite holder.

In any case, if the above described example is taken, the numbers of teeth of the wheels of this reverser-reducer 30 may be as follows:

For the satellites 33 and 36, 19 and 23 teeth respectively,
For the central planets 39 and 40, 35 and 22 teeth respectively,
For the peripheral planets 43 and 46, 73 and 68 teeth respectively,
For the pinions 34 and 35, 53 and 61 teeth respectively.

In this example, if the input speed of the central planets 39 and 40 is 2000 r.p.m., the input speeds of the satellite holder 2 of the main box will be ±563 r.p.m.

According to a second embodiment of the main box 1, it is desired to obtain at the output of the latter eight suitably staged forward speeds. To this end, and as is evident from the kinematic diagrams of FIGURES 2 and 3, the box of the invention comprises, in combination with the main box 1, a secondary box 46.

This secondary box 46 may advantageously be of the epicyclic type and it comprises, according to the invention, an input element, two reaction elements, and an output element.

According to the embodiment illustrated in the kinematic diagrams of FIGURES 2 and 3, the box 46 comprises:

A free satellite holder 47 forming the output element and to this end securely connected to the pinion 34 engaging with the pinion 35 of the satellite holder 2 of the main box 1, Two satellites 48 and 49 securely connected to one another and mounted idly on the satellite holder 47, Two peripheral planets 50 and 51, forming the reaction elements, these planets being in mesh with the above-mentioned satellites and connected, by coaxial shafts 52 and 53, to the discs of two brakes 54 and 55 respectively, situated outside the casing of the gear box of the invention, A central planet 56 forming the input element, this central planet engaging with the satellite 49 and being carried by a shaft 57, provided with one of the plates of a coupling 58 normally used for coupling the box to the motor or engine.

The secondary box 46 operates in the following manner:

In order to engage the slow range of the four speeds of the main box 1, the brake 55 is applied, the brake 54 remaining free.

Consequently, the central planet 56 which is driving, rotates the satellite 49 which rolls on the peripheral planet 51, it being understood that the latter is immobilized by the brake 55. The satellite 49 thus has an epicyclic movement, the orbital component of which it transmits to the satellite holder 47 which rotates and causes, by means of the set of pinions 34 and 35, the rotation of the satellite holder 2 of the main box 1.

In order to engage the rapid range of the four speeds of the main box 1, the brake 54 is applied, the brake 55 remaining free.

Consequently, the central planet 56 which is driving, rotates the satellite 49 as well as the satellite 48 securely connected to the preceding one. This satellite 48 rolls on the peripheral planet 50, since the latter is immobilized by the brake 54, and transmits the orbital component of its epicyclic movement to the satellite holder 47. This latter rotates and the same applies to the satellite holder 2 of the main box 1, being given that these satellite holders are connected by the set of pinions 34 and 35.

It will be apparent that the choice of the number of teeth of the wheels of the secondary box 46 is mandatory in order that the four slow speeds which are finally obtained become intercalated one by one between the four rapid speeds.

If the above example is taken, the number of teeth of the wheels of this secondary box 46 may be as follows:

For the central planet 56, 30 teeth,

For the satellites 48, and 49, 28 and 13 teeth respectively,

For the peripheral planets 50 and 51, 72 and 57 teeth respectively.

In this example, if the input speed of the central planet 56 is 2000 r.p.m., the slow input speed of the satellite holder 2 of the main box 1 will be 599 r.p.m. and the rapid input speed, 822 r.p.m. Under these conditions, the eight output speeds will be: 232, 318, 381, 522, 906, 1242, 1723 and 2363 r.p.m.

According to other embodiments of the main box 1, in the case where it is combined with the secondary box 46, it is desired to obtain at the output of this main box, in addition to the eight forward speeds, certain supplementary speeds. Consequently, according to the invention, one of the reaction elements of the secondary box 46 constitutes a second output which may be coupled to one of the elements of the third train of the main box 1.

In one of these embodiments illustrated by the kinematic diagram of FIGURE 2, a supplementary reverse speed is provided. To this end, the reaction element chosen is that which, when it is selected, determines the highest speed of the output element 47 of the secondary box 46. This is the peripheral planet 50. In addition, this reaction element 50 constituting the second output, may be connected to the output satellite holder 10 of the main box 1 by a selectable torque-transmitting component. This member may be constituted by a number of alternative known arrangements; in the example shown, it is constituted by a direct-drive dog clutch 59, a first part of which is fixed to the shaft 52 of the peripheral planet 50 and a second part of which is securely connected to a pinion 60 engaging with another pinion 61 with which the satellite holder 10 is provided.

This secondary box with two outputs illustrated in FIGURE 2, operates in the following manner:

In order to engage the slow range and the rapid range of the four speeds of the main box 1, one proceeds as indicated in the preceding description, but by releasing the direct drive dog clutch 59, In order to engage the reverse speed, the dog clutch 59 is put in gear, then the brake 55 is applied, leaving the brake 54 free.

Consequently, the central planet 56 which is driving, rotates the satellite 49 which rolls on the peripheral planet 51 being given that the latter is immobilized by the brake 55. The satellite 48, securely connected to the satellite 49, in its turn drives the peripheral planet 50 which transmits the movement, by means of the dog clutch 59 and the set of pinions 60 and 61 to the output satellite holder 10.

If the above mentioned numerical example is taken, the pinions 60 and 61 can have 41 and 73 teeth respectively.

In this case, the eight forward speeds are those indicated in the preceding description and the reverse speed is −268 r.p.m.

In the other embodiment shown in the kinematic diagram of FIGURE 3, two supplementary backing speeds and one supplementary forward speed substantially equal to one of these latter are provided. To this end, the reaction element chosen for constituting a second output of the secondary box 47 is, as previously, that which, when it is selected, determines the highest output speed of this box; this is therefore the peripheral planet 50. In addition, this reaction element 50 may be connected to the peripheral planet 16 of the main box 1, by a selectable torque-transmitting member. This member may be constituted, as for the embodiment of FIGURE 2, by a direct drive dog clutch 59 inserted between the tubular shaft 52 of the peripheral planet 50 and a pinion 62 engaging with another pinion 63 securely connected to the tubular shaft 26 connecting the peripheral planet 16 of the main box to the brake 27.

This secondary box with two outputs shown in FIGURE 3, operates in the following manner:

In order to engage the slow range and the rapid range of the four speeds of the main box 1, one proceeds as is indicated in the preceding description apropos FIGURE 2.

In order to engage the rapid reverse speed, the dog clutch 59 is put into gear then the brakes 55 and 25 are applied, leaving the brakes 54, 19, 18 and 27 free.

Consequently, the central planet 56 which is driving, rotates the satellite 49 which rolls on the peripheral planet 51 immobilized by the brake 55. The satellite 48 securely connected to the satellite 49 in its turn drives the peripheral planet 50 which transmits its rotation, by means of the dog clutch 59 and the set of pinions 62 and 63, to the peripheral planet 16 of the main box 1. This planet 16 produces an epicyclic movement of the satellite 11, being given that the central planet 14 is immobilised by the brake 25, and the orbital component of this movement is transmitted to the output satellite holder 10.

In order to engage the slow reverse speed, the dog clutch 59 is put in gear, then the brakes 55 and 20 are applied leaving the brakes 54, 19, 25 and 27 free.

Consequently, the central planet 56 which is driving, rotates the satellite 49 which rolls on the peripheral planet 51 immobilized by the brake 55. The satellite 48 securely connected to the satellite 49 in its turn drives the peripheral planet 50 which transmits its rotation, by means of the dog clutch 59 and the set of pinions 62 and 63, to the peripheral planet 16 which is in mesh with the satellite 11 of the main box 1. However, at the same time, the satellites 48 and 49 also orbitally rotate the satellite holder 47 which transmits the movement of rotation, by means of the set of pinions 34 and 35, to the satellite holder 2 of the main box 1. The satellite holder 2 then orbitally rotates the satellite 3 which also rotates on itself, being given that it rolls on the central planet 8 immobilized by the brake 20. The satellite 3 drives the peripheral planet 6 securely connected to the central planet 14 which in its turn drives the satellite 11. This latter is thus urged by the planets 16 and 14; the result is that it causes the rotation of the output satellite holder 10.

In order to engage the supplementary forward speed (which is substantially equal to the slow reverse speed), the direct drive dog clutch 59 is put in mesh, then the brakes 55 and 19 are applied, leaving the brakes 54, 20, 25 and 27 slack.

Under these conditions, the central planet 56 which is driving, rotates the satellite 49 which rolls on the peripheral planet 51 immobilized by the brake 55. The satellite 48 securely connected with the satellite 49 in its turn drives the peripheral planet 50 which transmits its rotation, by means of the dog clutch 59 and the set of pinions 62 and 63, to the peripheral planet 16, which is in mesh with the satellite 11 securely connected to the satellite 12 of the main box 1. However, at the same time, the satellites 48 and 49 also orbitally rotate the satellite holder 43 which transmits the movement of rotation, by means of the set of pinions 34 and 35, to the satellite holder 2 of the main box 1. This satellite holder 2 then orbitally rotates the satellite 4 which also rotates on itself, being given that it rolls on the central planet 9 immobilized by the brake 19. The satellite 4 drives the peripheral planet 7 securely connected with the central planet 15 which in its turn drives the satellite 12. As this latter is urged by the two planets 16 and 15, it brings about the rotation of the output satellite holder 10.

It is important to note that the three supplementary forward and reverse speeds are available one from the other simply by actuating the brakes 19 and 20, the dog clutch 59 remaining engaged.

If the above mentioned numerical example is taken, the pinions 62 and 63 may have 58 and 56 teeth respectively. In this case, the eight forward speeds are those indicated in the preceding description; the rapid reverse speed is then −350 r.p.m., the slow reverse speed is −118 r.p.m. and the slow forward speed is 108 r.p.m.

Other modifications may be envisaged.

For example, according to a first modification, the shaft 21a of the main box 1 may be connectable to the shaft 52 of the secondary box 46 and to this end, a pinion similar to pinion 62 (FIGURE 3) may be put in mesh with the pinion 22. Then two supplementary speeds are obtained by applying the brakes 55 and 27 for one, or the brakes 55 and 19 for the other.

For the first supplementary speed, the central planet 56 which is driving, rotates the satellite 49 which rolls on the peripheral planet 51 immobilized by the brake 55. The satellite 48 securely connected to the satellite 49 in its turn drives the peripheral planet 50 which transmits its rotation, by means of the above mentioned set of pinions in the pinion 22, to the central planet 14. This latter then drives the satellite 11 which rolls on the peripheral planet 16 immobilized by the brake 27, this producing a rotation of the output satellite holder 10.

For the second supplementary speed, the central planet 56 which is driving, rotates the satellite 49 which rolls on the peripheral planet 51 immobilized by the brake 55. The satellite 48 securely connected to the satellite 49 in its turn drives the peripheral planet 50 which transmits its rotation as previously to the central planet 14 which causes the satellite 11 to rotate. However, at the same time, the satellites 48 and 49 also orbitally rotate the satellite holder 47 which transmits the rotational movement, by means of the set of pinions 34 and 35, to the satellite holder 2. This latter then drives the satellite 4 which rolls on the central planet 9 immobilized by the brake 19 and rotates the peripheral planet 7 coupled to the central planet 15. The satellites 11 and 12 are thus moved at different speeds by the planets 14 and 15, this causing the rotation of the output satellite holder 10.

According to another modification, the selective coupling of the satellite holder 2 of the main box (FIGURE 3) may be provided either with the satellite holder 47 of the secondary box 46 (due to the set of pinions 34 and 35 which must in this case be of the non-permanent connection type, or with the peripheral planet 50 of this secondary box 46 (due to another set of pinions of the same type as pinion 35. This latter connection may be achieved by providing planet 50 with an external ring gear 50' disposed close to, and having the same diameter as, pinion 34, and mounting carrier 2 so that it is axially displaceable, in the direction of the double arrow, to be brought into mesh with gear 50'. Four supplementary speeds are then obtained by respectively applying the brakes 55, 19 and 27 or the brakes 55, 20 and 27, or the brakes 55, 20 and 19 or brakes 55, 19 and 25.

For the first supplementary speed, the central planet 56 which is driving, rotates the satellite 49 which rolls on the peripheral planet 51 immobilized by the brake 55. The satellite 48 together with the satellite 49 drives the peripheral planet 50 which drives, by means of one of the above mentioned sets of pinions, the satellite holder 2 which rotates the satellites 3 and 4. The satellite 4 rolls on the central planet 9 immobilized by the brake 19 and drives the satellite 12 by means of the peripheral planet 7 and the central planet 15. The satellite 11 securely connected to satellite 12 rolls on the peripheral planet 16 immobilized by the brake 27 and causes the rotation of the output satellite holder 10 connected to the output coupling 29.

For the second supplementary speed, the satellite holder 2 is driven as previously and drives the satellite 3 which rolls on the central planet 8 immobilized by the brake 20. The satellite 3 drives, by means of the planets 6 and 14, the satellite 11 which rolls on the peripheral planet 16 immobilized by the brake 27 and this results in the satellite holder 10 rotating.

For the fourth supplementary speed, the satellite holder 2 is driven as previously and drives the satellites 3 and 4. The satellite 3 rolls on the central planet 8 immobilized by the brake 20 and drives the satellite 11 by means of the planets 6 and 14. At the same time, the satellite 4 rolls on the central planet 9 immobilized by the brake 19 and drives the satellite 12 by means of the planets 7 and 15. The satellites 11 and 12 thus moved bring about the rotation of the output satellite holder 10.

For the fourth supplementary speed, the satellite holder 2 is driven as previously and drives the satellites 3 and 4. The satellite 3 rolls on the peripheral planet 6 immobilized by the brake 25 and, similarly, the satellite 4 rolls around the central planet 9 immobilized by the brake 19. This satellite 4 drives the satellite 12 by means of the planets 7 and 15, the satellite 11 rolling on the central planet 14 immobilized by the brake 25. The satellites 11 and 14 thus moved bring about the rotation of the output satellite holder 10.

According to yet another modification, the brakes 27 and 25 can be applied, leaving the other brakes slack. The motor is thus free, whilst the output element 10 is immobilized. Consequently, either a speed checking brake or a road brake, or a parking brake can be obtained according to the mode of action exerted on the brakes 27 and 25.

Figure 4:
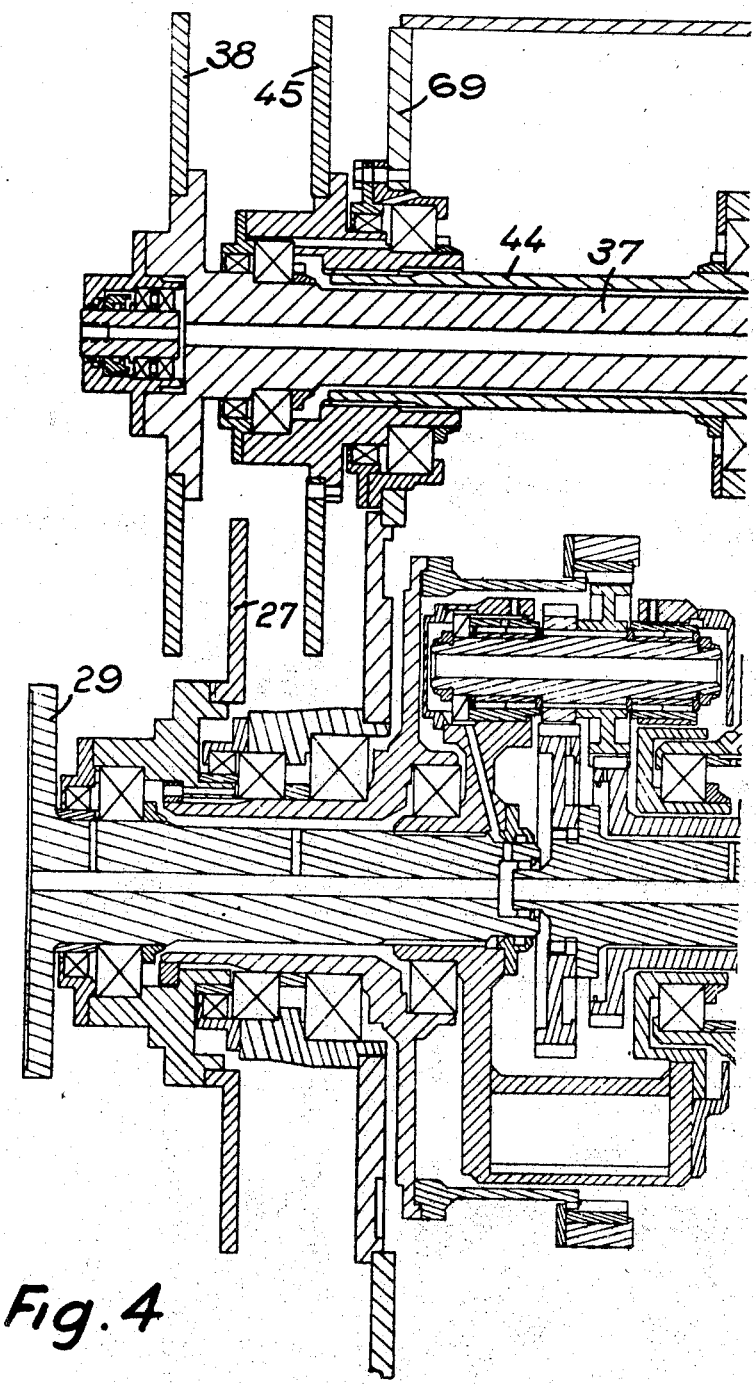
Figure 4A:
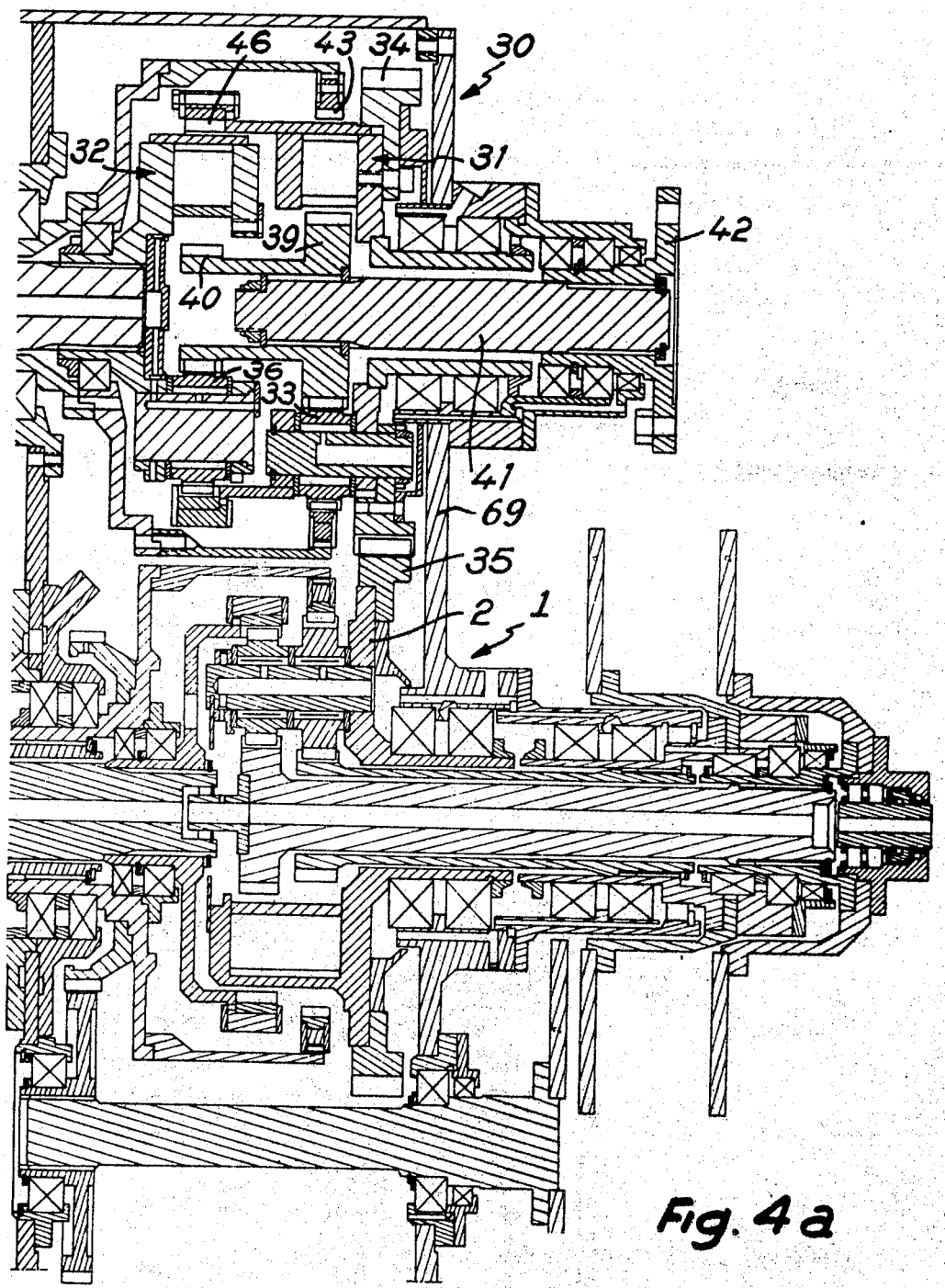
Figure 5:
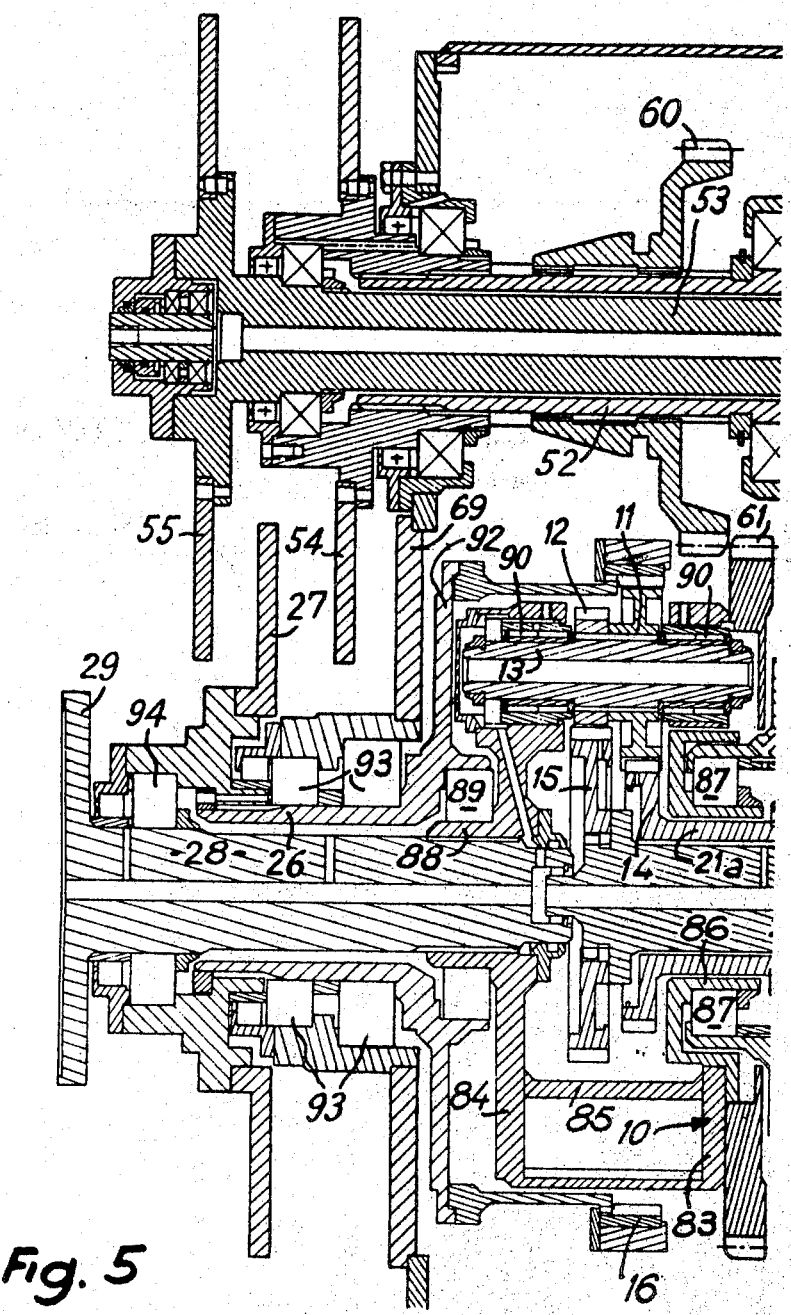
Figure 5A:
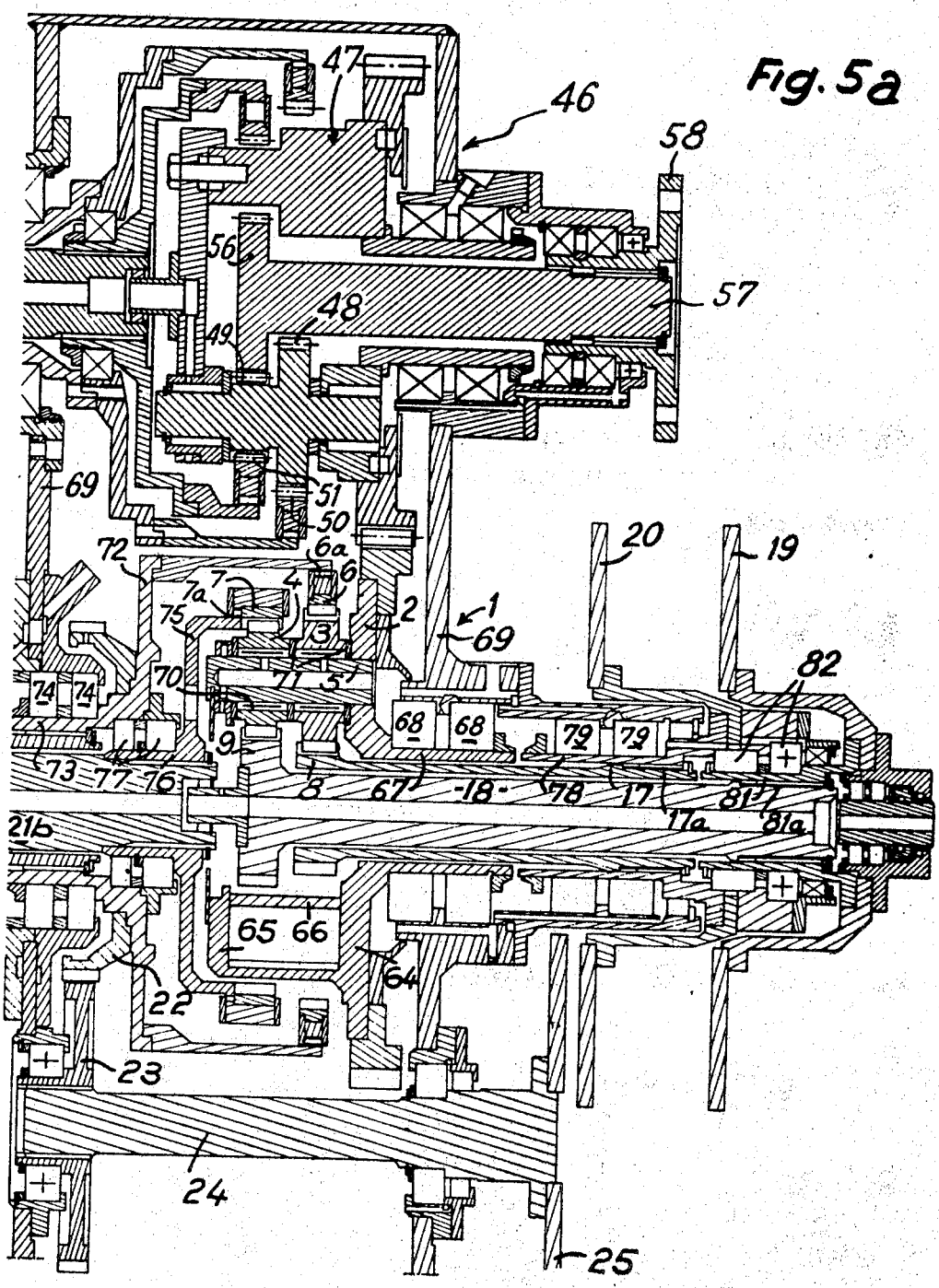
Figure 6:
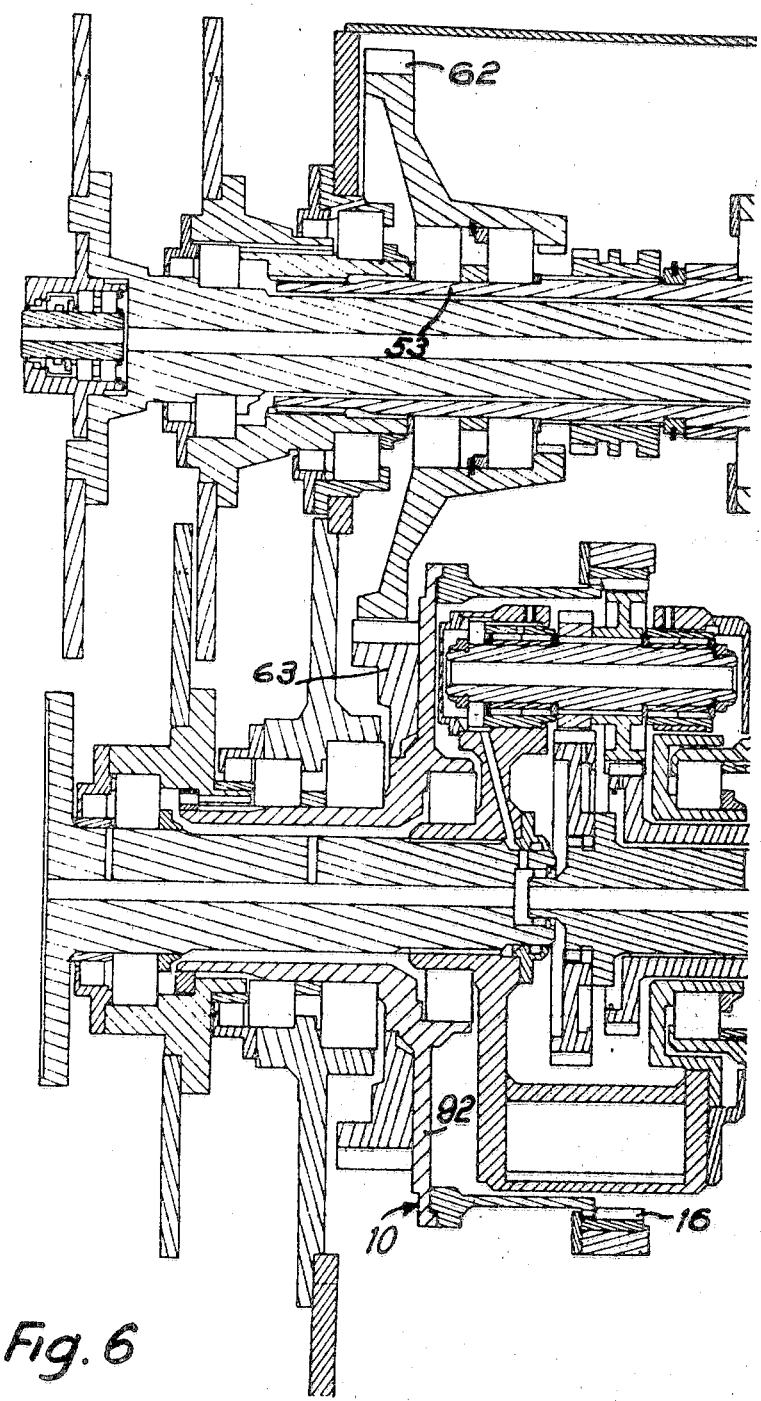
Figure 6A:
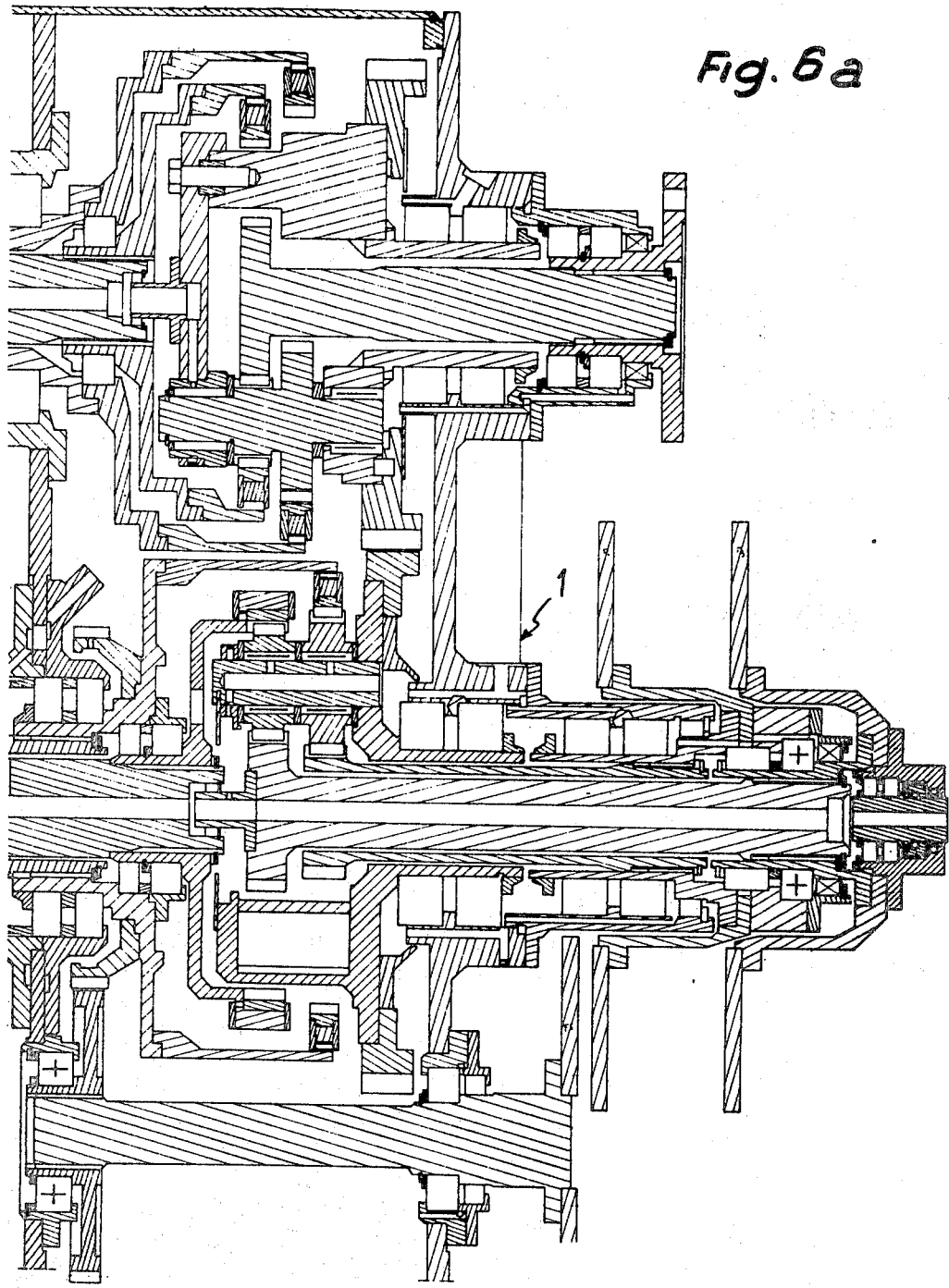

Three embodiments of the box of the invention using the kinematics of FIGURES 1 to 3 are illustrated in detail in FIGURES 4 to 6.

Concerning the main box 1, FIGURES 4 to 6 clearly show the arrangement of the movable elements, but it is nevertheless useful to examine more deeply the assembly of the epicyclic trains. The satellite holder 2 is made as an open cage and comprises two flanges 64 and 65 connected by cross pieces 56. The flange 64 is securely connected to a tubular sleeve 67, supported, by means of bearings 68, by a fixed bearing of the casing 69. Between the flanges 64 and 65 are fixed three shafts 5 distributed equiangularly and about which three sets of two independent satellites 3 and 4 are mounted idly, by means of needle bearings 70 and anti-friction discs 71. The shafts 5 and each group of three satellites associated therewith can be arranged in the manner illustrated for the gears 23 in FIGURE 2 of U.S. Patent No. 3,022,683, issued to J. P. Simon on Feb. 27, 1962. The same is true for the other three-satellite sets employed in embodiments of the present invention.

The planets 6 to 9 are then automatically centered on these three sets of satellites 4 and 5 with which they must co-operate. In fact, the peripheral planet 6 is mounted to float by means of spaced grooves 6a with clearance, in a drum 72 which is supported at its terminal hub 73 by bearings 74 of the casing 69. Similarly, the peripheral planet 7 is mounted to float, by means of spaced grooves 7a with clearance, in another drum 75 which is supported at its terminal hub 76 by bearings 77 housed in the hub 73. Under these conditions, the planets 6 and 7 are centered on the satellites 4 and 5 and float with respect to the drums 72 and 75.

The central planet 8 is cut from the overhanging end of the tubular shaft 17, which is coupled, at its opposite end, by means of spaced, axially extending grooves 17a located a substantial distance away from gear 8, in a sleeve 78 which alone is supported by the casing 69 by means of bearings 79. This sleeve 78 is moreover securely connected to the disc brake 20. Similarly, the central planet 9 is cut from the overhanging end of the shaft 18 which is coupled, at its other end, by means of spaced, axially extending grooves 81a located a substantial distance away from gear 9, in a sleeve 81 supported, by means of bearings 82, by one of the parts carrying the disc brake 20, which sleeve 81 is in addition securely connected to the disc brake 19.

In other words, the central planets 8 and 9 are mounted to float so as to be centered on the satellites 4 and 5, whilst the disc brakes 19 and 20 are suitably supported.

The automatic centering of the planet is also applied for the third train of the main box 1. In fact, the satellite holder 10 comprises two flanges 83 and 84 connected by cross pieces 85. The flange 83 is securely connected to a tubular sleeve 86 supported, by means of a bearing 87, by the fixed bearing of the casing 69 which already supports the hub 73 of the planet 6. In addition, the flange 84 is rigidly secured to a sleeve 88 supported by a bearing 89 lodged in a member which is defined hereinafter. The three shafts 13, with which three sets of two satellites 11 and 12 are rendered integral, by means of grooves for example, are mounted idly between the flanges 83 and 84, by means of needle bearings 90.

The planets 14 and 16 are then automatically centered on these three sets of satellites 11 and 12 with which they must co-operate. The central planet 14 is cut from the overhanging end of the tubular shaft 21a, the other end of which is simply coupled, by a groove for example, in the hub 73 of the drum 72 carrying the peripheral planet 6. The central planet 15 is joined onto the overhanging end of the shaft 21b which is coupled, at its other end, by means of a groove, in the sleeve 76 of the drum 75 carrying the peripheral planet 7. The peripheral planet 16 is joined into a drum 92 whose hub, which forms the tubular shaft 26, is axially cut away and supported by bearings 93 of the casing 69. Moreover, it is in this hub 26 that the bearing 89 is in addition housed, said bearing supporting the hub 88 of the flange 84 of the satellite holder 10.

Due to the automatic centering of the planets 6 to 9 and 14 to 16 on the three sets of satellites 3 and 4 of the satellite holder 2 and on the three sets of satellites 11 and 12 of the satellite holder 10 respectively, a compact, very resistant structure is obtained in which the stresses are balanced.

The output shaft 28 securely connected to the coupling plate 29 is connected, by means of an extreme groove, to the hub 88 of the satellite holder 10 and it is supported at its other end by a bearing 94 housed in the hub of the disc brake 27 joined to the tubular shaft 26.

I claim:

1. A geared transmission comprising: an input member arranged to be driven by an external power source; an output member arranged to drive an external device at any selected one of four different speeds relative to the speed of said input member; support means; and first, second and third epicyclic gear trains connected between said input and output members and connected together to cooperate mutually to transmit motion from said input member to said output member, each of said gear trains being composed of at least two planet gears, a satellite holder and at least one satellite carried by said holder, said gears, holder and satellite constituting, for said first and second gear trains, a common input element connected to be driven by said input member, for each of said first and second trains, an independent output element and an independent reaction element, said reaction element including engaging means operatively associated with said support means to be selectively engaged therewith, and, for said third train, two independent input elements each permanently connected to said output element of a respective one of said first and second trains, an output element connected to said output member, and two independent reaction elements each including engaging means operatively associated with said support means to be individually selectively engaged therewith one of said reaction elements being independent of both said input elements of said third train, there being four engaging means each selectively operable for placing its associated reaction element in engagement with said support means.

2. A transmission as defined in claim 1, wherein at least one of said input elements of said third train also functions as one of its reaction elements.

3. A transmission as definaed in claim 1, wherein said common input element of said first and second trains is constituted by a single satellite holder provided with at least two independent satellites, engaging with two peripheral planets forming said output elements of said first and second trains, and with two central planets forming said reaction elements of said first and second trains.

4. A transmission as defined in claim 1, wherein the single output element of said third train is constituted by a satellite holder provided with at least two satellites which are securely connected together, one of said satellites engaging with a central planet forming one of its said input elements, while the other said satellite is in mesh with a peripheral planet forming one of its said reaction elements and with a central planet functioning as one of its said input elements and the other one of its said reaction elements.

5. A transmission as defined in claim 1, wherein said input member is drivingly connected to a direction reversing means.

6. A transmission as defined in claim 5, wherein said direction reversing means incorporates gear reduction.

7. A transmission as defined in claim 1, wherein the said common input element of said first and second trains is connected to the output element of a two speed gear box which is of the epicyclic type and which comprises an input and two reaction elements each said reaction element including engaging means operatively associated with said support means to be selectively engaged therewith.

8. A transmission as defined in claim 7, wherein said output element of said two speed gear box is constituted by a satellite holder provided with at least two satellites of different sizes securely connected together, the larger of these satellites engaging with a peripheral planet forming a first one of said reaction elements of said two speed gear box while the smaller satellite is in mesh with a central planet forming said input element of said two speed box and with a peripheral planet forming the other said reaction element of said two speed box, said one reaction element being provided with a selectable torque-transmitting means connecting said one reaction element to one of said elements of said third gear train.

9. A transmission as defined in claim 7, wherein said common input element of said first and second gear trains is arranged to be selectively coupled either to said output element of said two speed gear box or to one of said reaction elements of said two speed gear box.

10. A transmission as defined in claim 7, wherein at least one of said reaction elements of said two speed gear box constitutes a second output, said transmission further comprising means to couple said second output to one of the elements of said third gear train.

11. A transmission as defined in claim 10, wherein said reaction element of said two speed gear box constituting a second output drives, by said means to couple, said output elements of said third gear train.

12. A transmission as defined in claim 10, wherein said reaction element of said two speed gear box constituting a second output drives one of said reaction elements of said third gear train.

13. A transmission as defined in claim 10, wherein said reaction element of said two speed gear box constituting a second output is that which, when it is engaged, determines the highest output speed of said box.

14. A transmission as defined in claim 1, wherein each said engaging means is arranged to immobilize its associated reaction element.

15. A transmission as defined in claim 14, wherein each said engaging means is constituted by a brake.

16. A transmission as defined in claim 15, wherein each said brake is a disc brake.

17. A transmission as defined in claim 1, wherein each said engaging means is arranged to apply an opposing torque to its associated reaction element.

18. A transmission as defined in claim 17, wherein each said engaging means is constituted by an eddy current brake.

19. A transmission as defined in claim 1, wherein said gear trains are disposed in a casing and each said satellite holder is supported at at least one side thereof by said casing and is provided with at least three satellites distributed equiangularly about the axes of rotation of said holder, and wherein one of the planet gears of each said gear train is constituted by a peripheral planet mounted in a floating manner to be centered by said three satellites of its associated gear train.

20. A transmission as defined in claim 1, wherein said three gear trains are disposed in a casing, at least one of said gear trains includes three satellites supported by said satellite holder and distributed equiangularly around the axis of rotation of said holder, and one of the planet gears of said one gear train is constituted by a central planet supported by said casing in a floating manner so as to be centered by said three satellites.

References Cited
UNITED STATES PATENTS

| | | | |
|---|---|---|---|
| 2,164,729 | 7/1939 | Wilson | 74—760 |
| 2,256,725 | 9/1941 | Pierce et al. | 74—758 X |
| 2,799,184 | 7/1957 | Miller | 74—759 |
| 2,930,258 | 3/1960 | Flinn | 74—758 X |
| 3,022,683 | 2/1962 | Simon | 74—759 |
| 3,109,324 | 11/1963 | Locher | 74—752 |
| 3,213,713 | 10/1965 | Sagara | 74—410 X |
| 3,307,433 | 3/1967 | Bennett et al. | 74—410 X |

DONLEY J. STOCKING, Primary Examiner

THOMAS C. PERRY, Assistant Examiner

U.S. Cl. X.R.

74—750, 758, 760, 764